United States Patent [19]

Stone et al.

[11] Patent Number: 5,636,362
[45] Date of Patent: Jun. 3, 1997

[54] PROGRAMMABLE HIGH WATERMARK IN STACK FRAME CACHE USING SECOND REGION AS A STORAGE IF FIRST REGION IS FULL AND AN EVENT HAVING A PREDETERMINED MINIMUM PRIORITY

[75] Inventors: James A. Stone, Phoenix, Ariz.; Andre E. Wolper, Portland, Oreg.

[73] Assignee: Intel Corporation, Santa Clara, Calif.

[21] Appl. No.: 314,418

[22] Filed: Sep. 28, 1994

[51] Int. Cl.[6] .................................................. G06F 13/00
[52] U.S. Cl. ..................... 395/456; 395/478; 395/872; 395/873; 364/240.5; 364/243; 364/243.4; 364/243.41; 364/244; 364/244.1; 364/246; 364/246.2; 364/247; 364/267; 364/DIG. 1
[58] Field of Search ............................... 395/800, 425, 395/725, 850, 859, 860, 868, 877, 878, 403, 445, 459, 467, 479, 483, 485, 497.04, 456, 478, 480, 872, 873, 876; 364/DIG. 1, DIG. 2

[56] References Cited

U.S. PATENT DOCUMENTS

| | | | |
|---|---|---|---|
| 3,242,467 | 3/1966 | Lamy | 395/478 |
| 3,820,078 | 6/1974 | Corley et al. | 395/250 |
| 4,296,465 | 10/1981 | Lemak | 395/310 |
| 4,400,771 | 8/1983 | Suzuki et al. | 395/478 |
| 4,402,041 | 8/1983 | Clark | 395/485 |
| 4,706,265 | 11/1987 | Furukawa | 395/241 |
| 4,811,208 | 3/1989 | Myers et al. | 395/800 |
| 5,043,885 | 8/1991 | Robinson | 395/425 |
| 5,210,850 | 3/1993 | Kelly et al. | 395/727 |
| 5,295,246 | 3/1994 | Bischoff et al. | 395/250 |
| 5,361,372 | 11/1994 | Rege et al. | 395/800 |
| 5,410,672 | 4/1995 | Sodek, Jr. et al. | 395/872 |

*Primary Examiner*—Meng-Ai T. An
*Attorney, Agent, or Firm*—Blakely, Sokoloff, Taylor & Zafman

[57] ABSTRACT

A programmable high watermark for a stack frame cache for eliminating frame spills initiated by certain critical events. A stack frame cache in a microprocessor is divided into two regions. The second region in the stack frame cache is reserved for context switches initiated by high priority events. Low priority events will result in a frame spill when the first region of the stack frame cache is filled. A high priority event will utilize the second region of the stack frame cache for a context switch if the first region is filled, thus eliminating the need for a reference to off-chip main memory.

20 Claims, 4 Drawing Sheets

PROGRAMMABLE HIGH WATERMARK IN STACK FRAME CACHE USING SECOND REGION AS A STORAGE IF FIRST REGION IS FULL AND AN EVENT HAVING A PREDETERMINED MINIMUM PRIORITY

BACKGROUND OF THE INVENTION

1. Field of the Invention

The present invention relates to the field of microprocessor architecture. More specifically, the present invention relates to a mechanism for minimizing main memory references initiated during context switches.

2. Art Background

The evolution of semiconductor technology has enabled microprocessors and microcontrollers today to be more powerful than room-sized computers a few decades ago. As processing chips become faster, the data traffic between a processor and off-chip main memory increases, resulting in a performance bottleneck. One approach to reducing the bottleneck is the use of a small high-speed local memory called a cache integrated on the processing chip itself.

A cache memory is used to store frequently used memory locations. If data required by the processor is in the cache, an off-chip memory reference is avoided since the data can be fetched directly from the on-chip cache. Further reductions in memory traffic are achieved by expanding cache memory designs to provide for caching frequently used instructions to reduce the time required for instruction fetching. Along the lines of data and instruction caches, there is also an efficiency increase obtainable by utilizing an on-chip stack frame cache such as that described by U.S. Pat. No. 4,811,208 issued Mar. 7, 1989 and assigned to the assignee of the present invention. An on-chip stack frame cache is an efficient memory used to store a set of registers during a context switch. A context switch is a call or interrupt that allows new code to execute with a new register set. The old register set is saved in the stack frame cache for retrieval upon returning from the context switch.

When a stack frame cache becomes full, the oldest register set in it has to be stored out to main memory. The time to do this depends greatly on the speed of the off-chip memory. The action of storing a frame of registers from a given context to main memory is referred to as a frame spill. A frame spill will greatly delay the execution of the existing (current) program. This is suboptimal where some context switches, such as critical interrupts, need to be executed with minimal delay. It would be advantageous, and is therefore an object of the present invention, to provide a mechanism for preserving on-chip resources for these critical events to prevent the delay of a frame spill.

SUMMARY OF THE INVENTION

From the foregoing it can be appreciated that it is desirable to provide a stack frame cache which avoids a frame spill to main memory when certain critical context switches are initiated. Accordingly, it is an object of the present invention to provide a method and apparatus for executing critical context switches with minimal delay.

These and other objects of the present invention are provided by a stack frame cache that is divided into two regions. A programmable high watermark is used to reserve the second region in the stack frame cache for high priority events. A stack frame cache is implemented which may store a fixed number of frames of cached local register sets. The high watermark is used for partitioning off a desired number of those frames to only be available for register storage when a context switch is initiated by a routine or interrupt of a designated minimum priority. Lower priority events will fill the stack frame cache below the high watermark. When the stack frame cache is filled to the high watermark, a frame spill occurs saving the oldest register set to main memory. When a routine or interrupt of a suitably high priority initiates a context switch, and the stack frame cache is filled to the high watermark, the local registers being swapped out to the stack frame cache may then be stored in the stack frame cache in the reserved portion above the high watermark. This allows the interrupt initiating the context switch to begin executing without waiting for a frame spill from the stack frame cache to main memory.

The high watermark may be programmed into main memory or another memory wherein, upon initialization of the system, the high watermark value is stored in a control register within the register file block. There is implemented in the register file block control circuitry for monitoring the depth of the stack frame cache. When the stack frame cache is filled to the high watermark, the control circuitry initiates a signal to an event handler within the instruction sequencer to begin a frame spill. The event handler circuitry is implemented such that the priority of the initiating event may be checked to determine whether or not the frame spill should be avoided and provide for saving of the local registers into the space above the high watermark in the stack frame cache.

In one embodiment of the present invention, the stack frame cache comprises an array of 6-transistor SRAM, 128-bits wide in which 4 lines are used to store the 16 32-bit local registers during a context switch. Accordingly, a frame spill requires the popping of 4 lines from the stack frame cache out to main memory. By allowing a context switch of a high priority to place the local registers into a reserved frame in the stack frame cache, the 4 pops required to remove the oldest frame from the stack frame cache array are eliminated and the initiating procedure may immediately begin processing the critical event.

The control logic within the register file block, in one embodiment, utilizes a counter that monitors the depth of the stack frame cache. A top of stack (TOS) pointer and bottom of stack (BOS) pointer are differenced and compared to the high watermark value. When the stack frame cache has reached the high watermark, the comparing will initiate a stack frame spill signal to an event handler for initiating the frame spill if necessary. Similarly, the event control logic will determine if the priority of the event is high enough to allow utilization of the reserved portion of the stack frame cache above the high watermark.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for segmenting a stack frame cache in a microprocessor to eliminate frame spills in the event of certain high priority context switches. In the following description, numerous specific details are set forth, such as particular priority levels and register sizes, in order to provide a thorough understanding of the present invention. It will be appreciated, however, by one skilled in the art that the present invention may be practiced in a more general application where such advantages provided by the present invention are desired. In other instances, well-known control structures and gate level circuits have not been shown in detail in order not to obscure important aspects of the present invention. Particularly, several functions are described to be carried out by various logic and comparing circuits. Once the various functions have been described, a practitioner of ordinary skill in the art would be able to implement the necessary logic and comparing circuits without undue experimentation.

Figure 1:
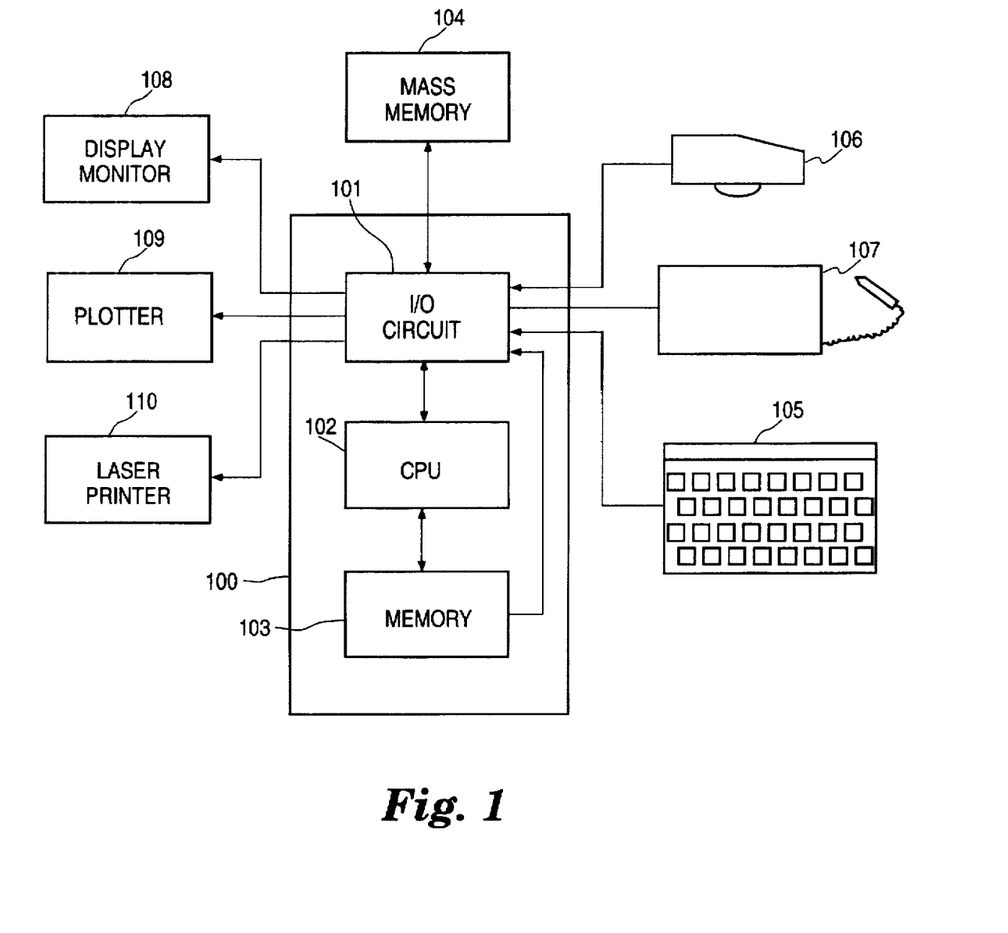
FIG. 1 illustrates a computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The present invention is most suitable for use in microprocessors which maintain sets of local registers which are advantageously cached during a context switch. Such microprocessor organizations are very common in Reduced Instruction Set Computing (RISC) microprocessors. Of course, other microprocessor architectures may take advantage of the present invention. This is true whether those microprocessors occupy a single chip or more than one chip and regardless of the materials used to fabricate the chip including silicon or gallium arsenide.

Figure 2:
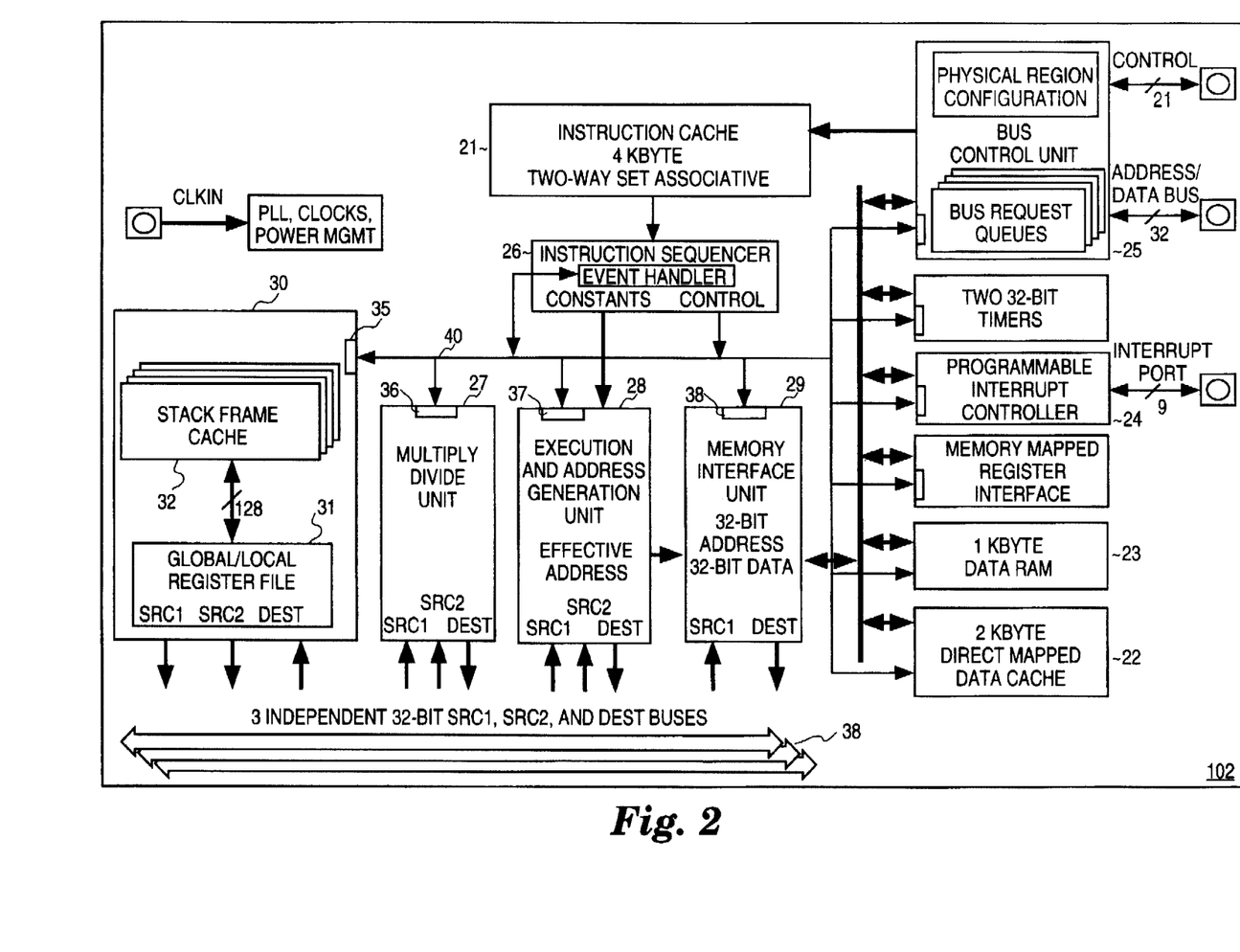
FIG. 2 is a block diagram illustrating one embodiment of a microprocessor which may incorporate the present invention.

Referring now to FIG. 2, a more detailed block diagram of the CPU 102 is illustrated. The microprocessor illustrated in FIG. 2 is only one embodiment of a microprocessor which may incorporate the present invention. The illustrative processor employs a 4-Kbyte, two-way set associative instruction cache 21, and a 2-Kbyte direct mapped data cache 22. There is also provided a 1-Kbyte data RAM 23 which is accessible to software for efficiency. For example, certain compilers may allocate the most frequently used variables into this RAM to reduce memory reference latencies. A programmable interrupt controller 24 provides a flexible, low latency means for requesting interrupts. It handles the posting of interrupts requested by hardware and software sources. In one embodiment, the interrupt controller 24 acts independently from the core of the processor, comparing the priorities of posted interrupts with the current process priority, off-loading this task from the core of the processor.

The microprocessor depicted in FIG. 2 communicates with external components such as the main memory 103 through a 32-bit multiplexed external bus. The bus control unit 25 is used to direct data transfer into and out of the processor. In one embodiment, the processor is equipped for coupling to a high bandwidth bus that provides burst transfer capability allowing up to 4 successive 32-bit data word transfers. Of course, other bus widths may be supported in alternative embodiments.

The microprocessor configuration illustrated in FIG. 2 utilizes three distinct functional units for carrying out instructions: multiply divide unit 27, execution/address generation unit 28 and memory interface unit 29 for processing memory requests based on addresses generated by execution/address generation unit 28. Instructions are propagated to the functional units through instruction sequencer 26. Instruction sequencer 26 receives instructions from the instruction cache 21 and decodes the instructions to be executed by one of the functional units. Typically, an instruction code will include an operation code (opcode) and provide information identifying the location of the source operands for the instruction (SRC1 and/or SRC2) as well as indicating a destination (DEST) address for the result of the operation by the execution units.

The processor illustrated in FIG. 2 uses a number of different load and store instructions to access memory. All operations take place at the register level. Source operands specify either a global register, a local register or a constant value as instruction operands. The functional units are coupled to the register control unit 30 via three independent 32-bit buses 38. These are identified as source 1 (SRC1), source 2 (SRC2) and the destination (DEST) buses. In alternative embodiments of the present invention, a wider single bus, or smaller multiplexed common bus may be utilized (or various combinations of separate buses) for communicating between the register control unit 30 and the various functional units.

The register control unit 30 of the microprocessor of FIG. 2 includes a register file 31 of local registers, global registers and scratch registers for use by the microprocessor. The register control unit also incorporates a stack frame cache 32 which, in one embodiment provide a cache for 8 frames of local registers to be stored upon a context switch. The register configuration of register control unit 30 will be described more fully below with respect to FIGS. 3 and 4.

There is also illustrated in the microprocessor of FIG. 2 a local co-processor or control bus 40 which the internal components of the microprocessor may use for accessing internal control registers. A number of the functional units within the microprocessor incorporate control registers for observing and manipulating the operation of the given functional unit. These are illustrated as elements 35, 36, 37 and 38 with respect to the primary functional units of the illustrated processor.

The microprocessor in accordance with one embodiment of the present invention utilizes 16 global registers, 16 local registers, and 32 literals (constants of 0 to 31) as instruction operands. In the described embodiment, the global and local registers are each 32 bits wide. The global registers are numbered g0 through g15. The local registers are numbered r0 through r15. Several of these registers are used for dedicated functions. For example, register r0 is defined as the previous frame pointer (PFP) which points to the first byte of the previous frame. The previous frame may reside on chip in the stack frame cache or off chip at the memory location in r0. There are also a number of scratch registers s8 through s15 available for internal use by the processor. Table I below illustrates the designation for various registers within the microprocessor.

TABLE I

| Register | Descriptive Name | Register Number | Instruction Operand |
|---|---|---|---|
| Global Registers | | g0–g15 | g0–g14 |
| | Frame Pointer | g15 | fp |
| Local Registers | | r0–r15 | r3–r15 |
| | Previous Frame Pointer | r0 | pfp |
| | Stack Pointer | r1 | sp |
| | Return Instruction Pointer | r2 | rip |

Global registers are general purpose 32-bit data registers that provide temporary storage for a program's computational operands. These registers retain their contents across procedure boundaries. As such, they provide a fast and efficient means for passing parameters between procedures. As noted, register g15 is reserved for the current frame pointer (FP), which contains the address of the first byte in the current (top most) stack frame. This is illustrated graphically by FIG. 3.

Figure 3:
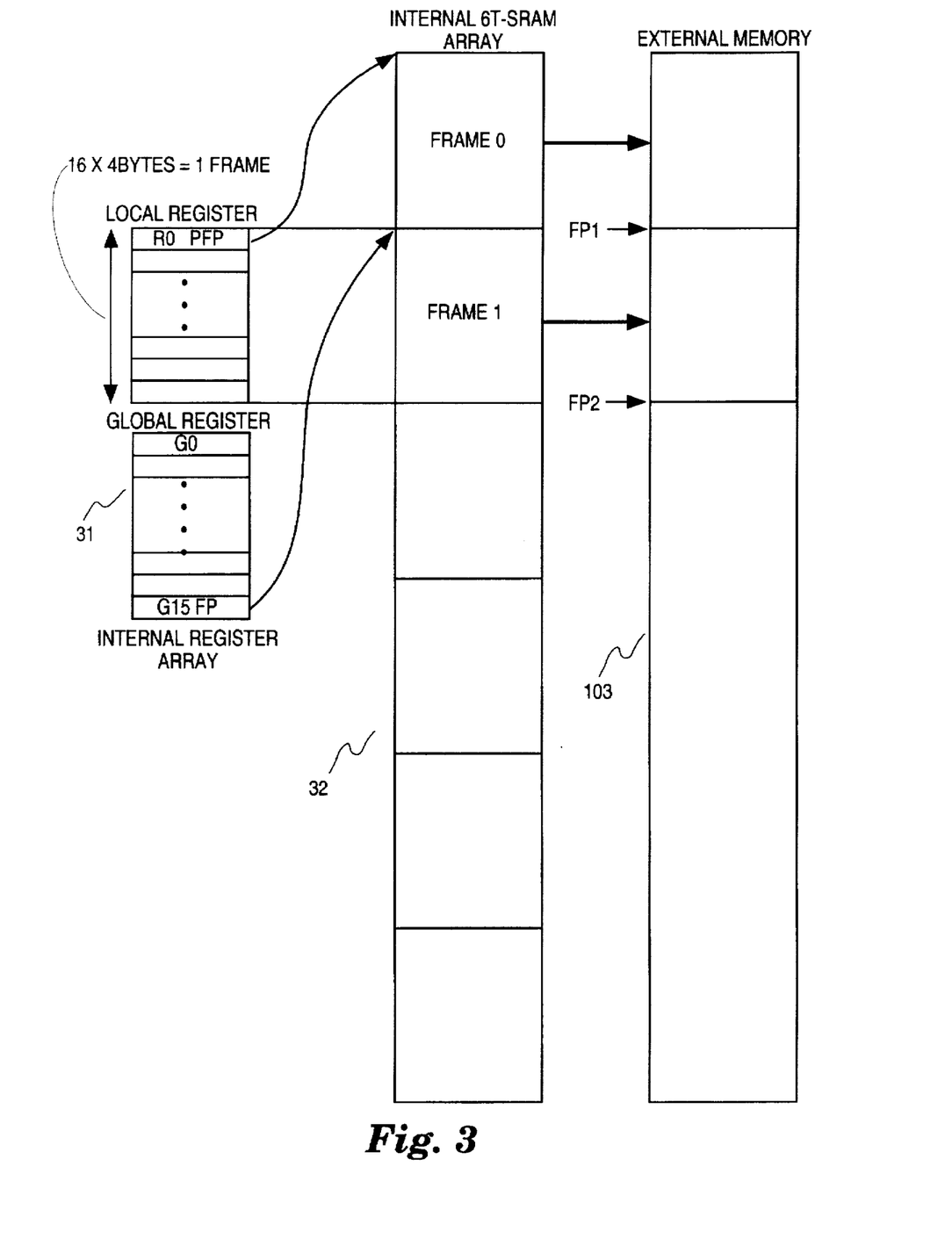
FIG. 3 illustrates diagramatically the memory organization for the caching of local registers to a stack frame cache.

The architecture of one embodiment of the microprocessor in accordance with the present invention provides a separate set of 32-bit local data registers (r0 through r15) for each active procedure. These registers provide storage for variables that are local to a procedure. Each time a procedure is called, the processor allocates a new set of local registers for that procedure and saves the calling procedure's local registers to the next available frame in the stack frame cache 32. Each frame within the stack frame cache 32 corresponds to a location mapped to main memory 103. When the stack frame cache becomes full (or reaches the high watermark to be described further herein), the oldest frame in the stack frame cache is written out to its corresponding location in main memory 103. This activity, a frame spill, takes a number of clock cycle and delays the execution of the procedure which resulted in the frame spill.

Figure 4:
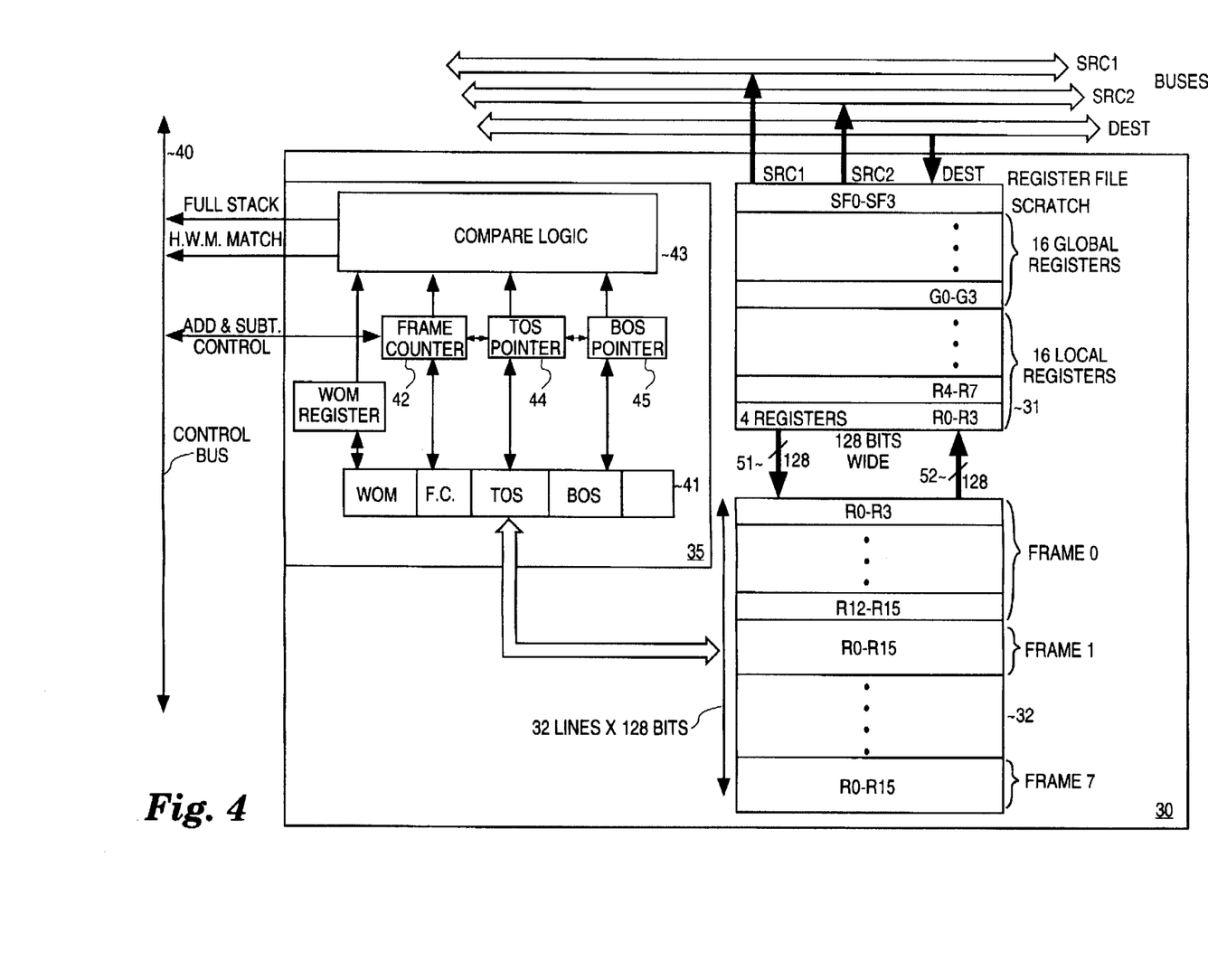
FIG. 4 is a more detailed diagram of one portion of a microprocessor incorporating the present invention in which a stack frame cache is segmented to reserve a portion for critical interrupts.

Referring now to FIG. 4, a more detailed diagram of the register control functional block 30 is illustrated. The register control block 30 includes the multi-ported register file 31. In the illustrated embodiment, the multi-ported register file 31 comprises four 32-bit registers per line (128 bits), for a total of 16 local registers, 16 global registers and 8 scratch registers. There is also provided a stack frame cache 32 which, in the illustrated embodiment, is implemented with 6-transistor Static Random Access Memory (SRAM) that is 128-bits wide by 32 lines deep. Each line in the SRAM is used for storing four 32-bit registers. In alternative embodiment, the stack frame cache 32 may be implemented with registers instead of SRAM. As can be seen, with 32 lines each capable of holding the contents of 4 registers, the stack frame cache 32 provides for the storage of up to 8 sets of local registers. The stack frame cache 32 is coupled to the register file 31 by means of two one-way 128-bit data paths 51 and 52. Of course, in an alternative embodiment a bi-directional bus may be used.

The operation of the stack frame cache without the present invention high watermark is as follows: When an executing procedure is interrupted by another procedure or makes a call to another procedure, its local registers r0 to r15 are cached in the first available frame of the stack frame cache 32. The new local register r0 (pfp) points to the saved frame within the stack frame cache. The interrupting routine or calling routine then utilizes the local registers during its execution. Each local register set within a stack frame cache includes one register, r0, with a pointer to the previous frame for unwinding the stack on successive return operations. There is further maintained in control block 35 a control register 41 which maintains a 5-bit top of stack (TOS) pointer and a 5-bit bottom of stack (BOS) pointer. There is also provided a frame counter 42 which increments by one every time a frame is written to the stack frame cache 32 and decrements every time a frame is popped back into the local registers.

When a context switch results in the last frame of the stack frame cache 32 being filled, the top of stack pointer and bottom of stack pointer will coincide. This is so because in the described embodiment the stack frame cache size is defined to be a power of two. Similarly, the counter 42 in one embodiment will indicate that 8 frames are stored in the stack frame cache 32. The comparing logic 43 will determine that the stack frame cache is filled and signal over the internal control bus 40 to an event handler incorporated within the instruction sequencer 26 that a frame spill is necessary. The oldest set of registers in the stack frame cache 32 will then be stored out to main memory leaving available one set of registers for a succeeding context switch. The process of storing old frames to memory is done through the register file using embedded microcode routines. Only then will the initiating procedure begin executing.

Each time a frame of registers is written from the stack frame cache 32 out to main memory, the counter 42 is decremented. Every time a frame spill from the stack frame cache to main memory is required, the procedure which resulted in the context switch of local registers is delayed while the 4 lines of the stack frame cache 32 are popped to the register file and then written to main memory. While this is not a significant delay for low priority events, it can be disastrous for certain, high priority events such as an interrupt signal caused by a sudden loss of power to the system. In such a circumstance, it is desirable to avoid a frame spill and begin execution of the new routine with minimal delay. The present invention thus provides for storage in control register 41 of a value indicating a high watermark (wom) within the stack frame cache 32.

The compare and event signal logic 43, upon a context switch, makes a determination whether or not the stack frame cache 32 is filled beyond the programmed high watermark. If the stack frame cache 32 is filled beyond the programmed high watermark, as indicated by control register 41, then the compare logic 43 will signal such a condition to the instruction sequencer 26 (H.W.M. Match signal). If the priority of the event initiating the context switch is sufficiently high, the instruction sequencer 26 will allow the local registers to remain in a frame in the stack frame cache 32 above the high watermark. In one embodiment of the present invention, the only events that allow this are interrupts above priority 28 (out of 32 possible priority states) and no calls. This may be varied as designers see fit. If the routine precipitating the context switch does not meet the criteria for allowing the caching above the high watermark, the comparing logic 43 will initiate a signal to the instruction sequencer 26 causing the oldest frame in the stack frame cache 32 to be spilled to main memory. Spilling the oldest frame to main memory keeps space free above the high watermark in the stack frame cache 32.

There are actually three counters in the illustrated embodiment of FIG. 4: the frame counter 42, top-of-stack (TOS) pointer 44 and bottom-of-stack (BOS) pointer 45. For a push to the stack frame cache 32 the TOS pointer and frame counter are incremented. For a return instruction (pop) the TOS pointer and frame counter are decremented. For a spill to main memory the frame counter is decremented and the BOS pointer is incremented. The values of all counters may be written or read through control register 41.

The high watermark is programmable in the sense that for embedded applications, a value may be stored in a specified control space of the main memory of a computer system implementing the microprocessor. Upon system initialization, the value of the high watermark will be transferred to the control register 41 over the control bus 40. The use of the programmable watermark allows for very flexible use of the processor. For example, if a value of 0 is indicated, then every context switch below the designated priority level will result in a spilling of local registers to the main memory, leaving the entire stack frame cache available for high priority events. Similarly, by setting the high watermark to 8, the entire stack frame cache is available for all events with no space being reserved for high priority events. Alternative embodiments may be implemented in which the high watermark may be changed dynamically by writing a new high watermark value to the control register 41 over the control bus 40. Similarly, the critical priority level may be altered as seen fit by designers as suitable for a particular purpose.

There has thus been described a method and apparatus for segmenting a stack frame cache to provide for the reservation of space for the handling of critical events without necessitating a frame spill. Although the present invention has been described in terms of various embodiments, those of ordinary skill in the art will appreciate that various modifications and alterations might be made. Accordingly, the scope and spirit of the present invention should be determined in accordance with the claims which follow.

We claim:

1. A data processing unit for use in a system having a memory remote from said data processing unit, said data processing unit comprising:
   a plurality of local registers for use by said data processing unit during an executing procedure;
   a stack frame cache coupled to said plurality of local registers for storing a plurality of frames of local register sets, said stack frame cache storing contents of said plurality of local registers upon a context switch;
   high watermark control logic coupled to said stack frame cache, wherein said high watermark control logic determines a first and second region of said stack frame cache, the second region of said stack frame cache available for use if said first region of said stack frame cache is full and a context switch is generated by an event having at least a predetermined minimum priority.

2. The data processing unit of claim 1 wherein said high watermark control logic includes a memory element for storing a high watermark value corresponding to a number of said plurality of frames included in the first region of the stack frame cache, said high watermark control logic preventing a frame spill from said stack frame cache to said memory when said stack frame cache is filled to or above said high watermark value when said context switch results from said event having at least said predetermined minimum priority.

3. The data processing unit of claim 2 further comprising a control bus coupled to said high watermark control logic for providing said high watermark value to said memory element.

4. The data processing unit of claim 3 further comprising a plurality of global registers, one of said plurality of global registers comprising a frame pointer register for pointing to one of said plurality of flames.

5. The data processing unit of claim 4 wherein one of said plurality of local registers comprises a previous frame pointer, said previous frame pointer for pointing to one of said plurality of frames which stores contents of a set of local registers previously stored in said stack frame cache.

6. The data processing unit of claim 1 wherein said stack frame cache comprises an array of static random access memory (SRAM).

7. The data processing unit of claim 6 wherein said array of SRAM comprises a plurality lines 128 bits across, each line for storing four 32-bit registers wherein four lines in said SRAM comprise one frame for storing the contents of 16 32-bit local registers.

8. The data processing unit of claim 7 wherein said plurality of lines comprises 32 lines for storing up to eight frames of 16 32-bit local registers.

9. The data processing unit of claim 1 wherein said stack frame cache comprises a plurality of registers for storing frames of contents of said plurality of local registers.

10. A computer system comprising:
    an input/output (I/O) means for providing a communicating interface;
    a memory means coupled to the I/O means for storing instructions and computer data;
    data input means coupled to the I/O means for providing data input and data output to interface the computer system with a computer user; and
    microprocessor means coupled to the I/O means for executing instructions and processing computer data, the microprocessor means including:
        a plurality of local registers for use by said microprocessor during an executing procedure;
        a stack frame cache coupled to said plurality of local registers for storing a plurality of frames of local register sets, said stack frame cache storing the contents of said plurality of local registers upon a context switch; and
        high watermark control logic coupled to said stack frame cache, wherein said high watermark control logic determines a first and second region of said stack frame cache, the second region of said stack frame cache available for use if said first region of said stack frame cache is full and a context switch is generated by an event having at least a predetermined minimum priority.

11. The computer system of claim 10 wherein said high watermark control logic includes a memory element for storing a high watermark value corresponding to the number of frames included in said subset of said plurality of frames, said high watermark control logic preventing a frame spill from said stack frame cache to said memory means when said stack frame cache is filled to or above said high watermark value when said context switch results from said event having at least said predetermined minimum priority.

12. The computer system of claim 11 further comprising a control bus coupled to said high watermark control logic for providing said high watermark value to said memory element from said memory means.

13. The computer system of claim 12 further comprising a plurality of global registers, one of said plurality of global registers comprising a frame pointer register for pointing to one of said plurality of frames.

14. The computer system of claim 13 wherein one of said plurality of local registers comprises a previous frame pointer for pointing to one of said plurality of flames which stores contents of a set of local registers previously stored in said stack frame cache.

15. The computer system of claim 10 wherein said stack frame cache comprises an array of static random access memory (SRAM).

16. The computer system of claim 15 wherein said array of SRAM comprises a plurality lines 128 bits across, each line for storing four 32-bit registers wherein four lines in said SRAM comprises one frame for storing the contents of 16 32-bit local registers.

17. The computer system of claim 16 wherein said plurality of lines comprises 32 lines for storing up to eight frames of 16 32-bit local registers.

18. The computer system of claim 17 wherein said stack frame cache comprises a plurality of registers for storing frames of contents of said plurality of local registers.

19. A method of operating a data processing system having a plurality of local registers and a stack frame cache comprising the steps of:

setting a high watermark value for said stack frame cache, wherein said high watermark value determines a first and second region of frames in said stack frame cache;

upon a context switch initiated by a procedure having a priority below a predetermined threshold:
  if an empty frame exists in said first region, writing contents of said plurality of local registers to a frame in said first region of said stack frame cache;
  if all frames in said first region are filled, saving the oldest frame in said stack frame cache to an external memory and writing the contents of said plurality of local registers to said frame in said first region of stack frame cache; and
  proceeding with executing said procedure having said priority below said predetermined threshold;

upon a context switch initiated by a procedure having a priority equal to or greater than said predetermined threshold:
  if an empty frame exists in said first region, writing contents of said plurality of local registers to a frame in said first region of said stack frame cache;
  if all frames in said first region are filled, writing contents of said plurality of local registers to a frame in said second region of stack frame cache without initiating a frame spill to external memory; and
  proceeding with executing said procedure.

20. The method of claim 19 wherein said setting step comprises the step of storing said high watermark value in a memory element coupled to said stack frame cache.

* * * * *

UNITED STATES PATENT AND TRADEMARK OFFICE
CERTIFICATE OF CORRECTION

PATENT NO. : 5,636,362
DATED : June 3, 1997
INVENTOR(S) : Stone et al.

It is certified that error appears in the above-identified patent and that said Letters Patent is hereby corrected as shown below:

In column 8 at line 18 delete "flames" and insert --frames--

In column 9 at line 16 delete "flames" and insert --frames--

Signed and Sealed this

Ninth Day of September, 1997

Attest:

BRUCE LEHMAN

*Attesting Officer*  *Commissioner of Patents and Trademarks*